Figure 12:
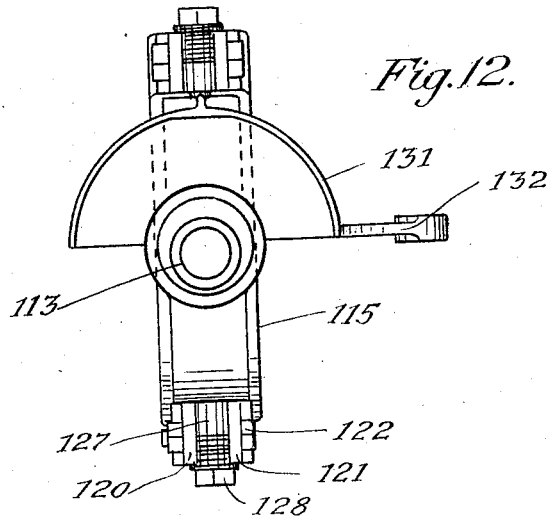

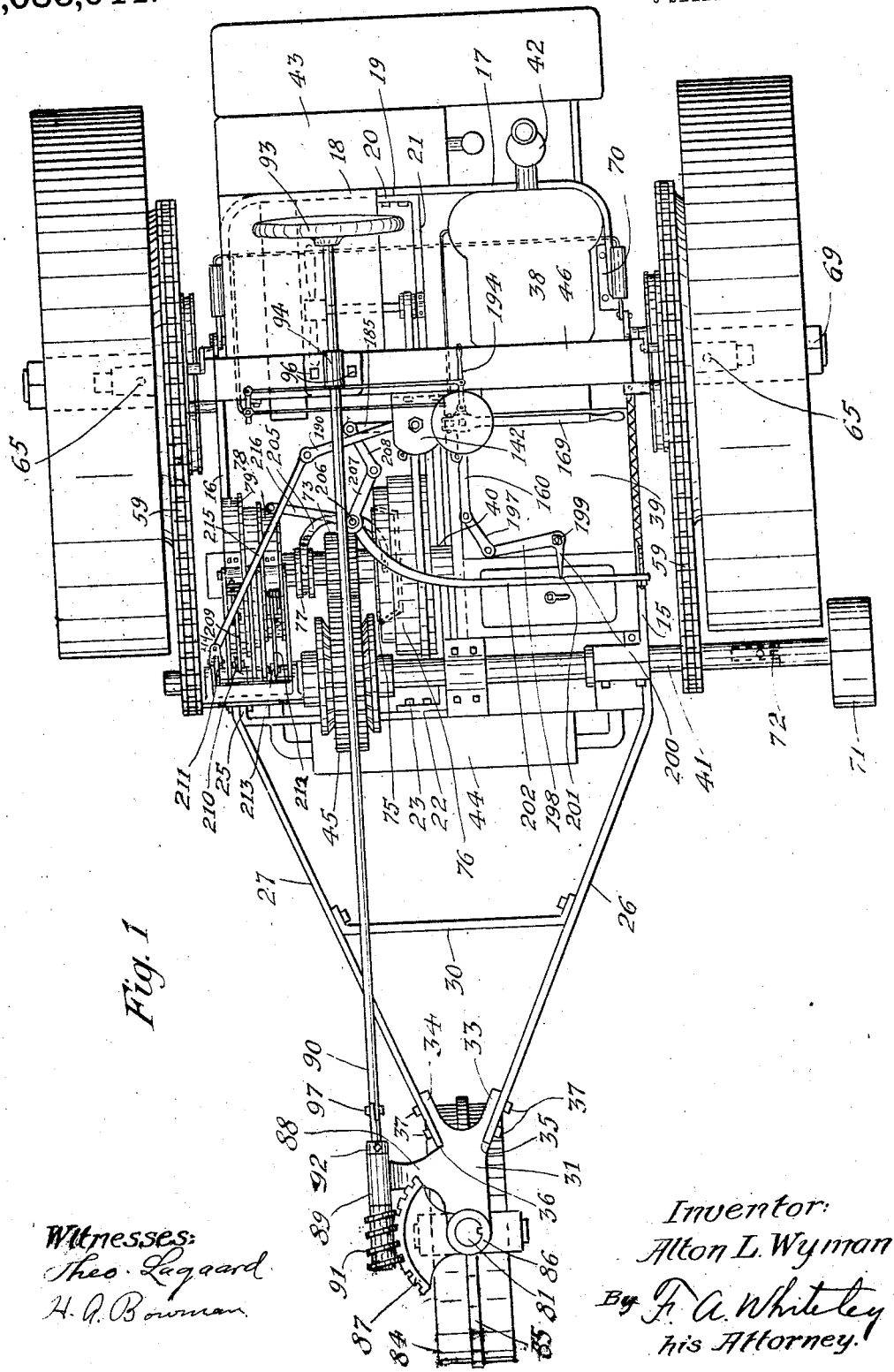

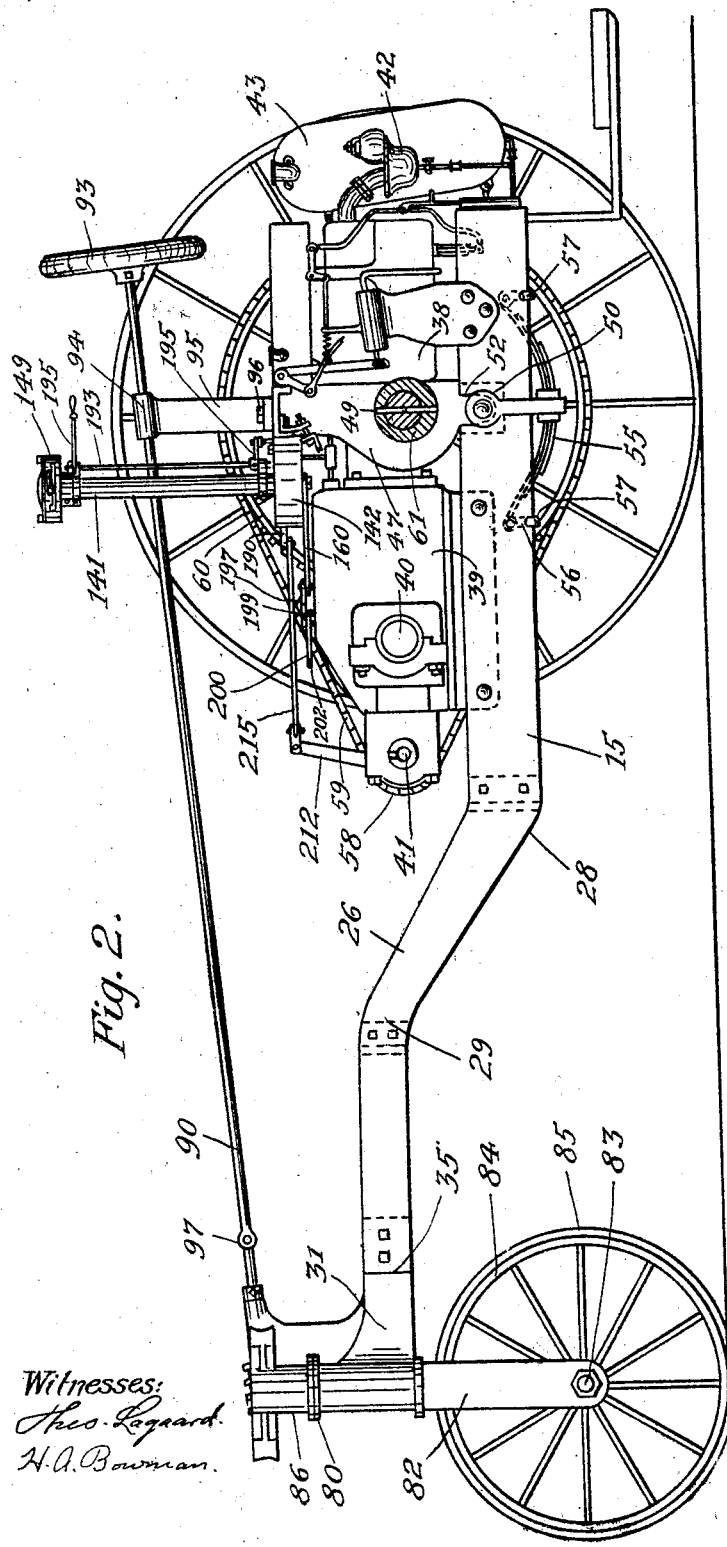

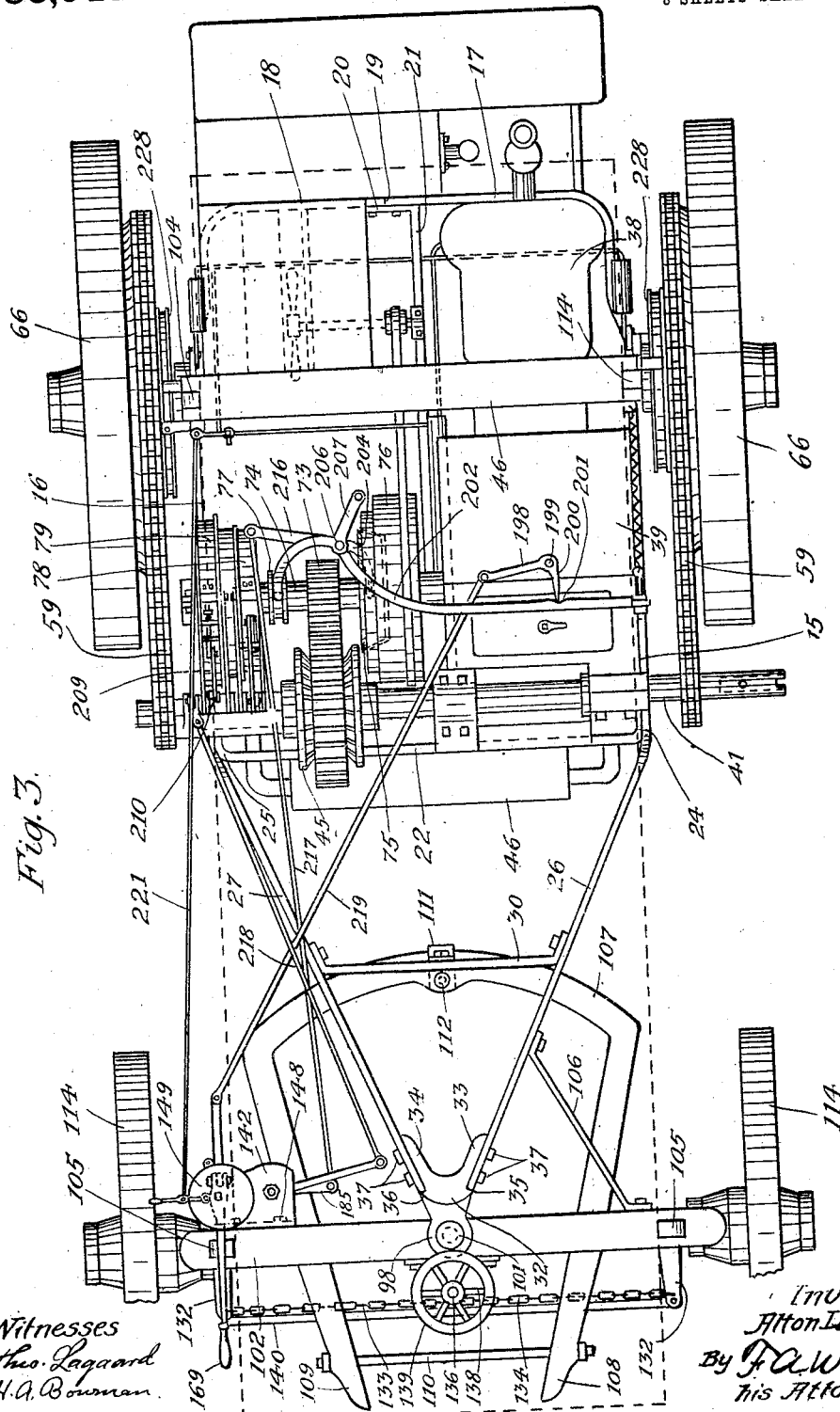

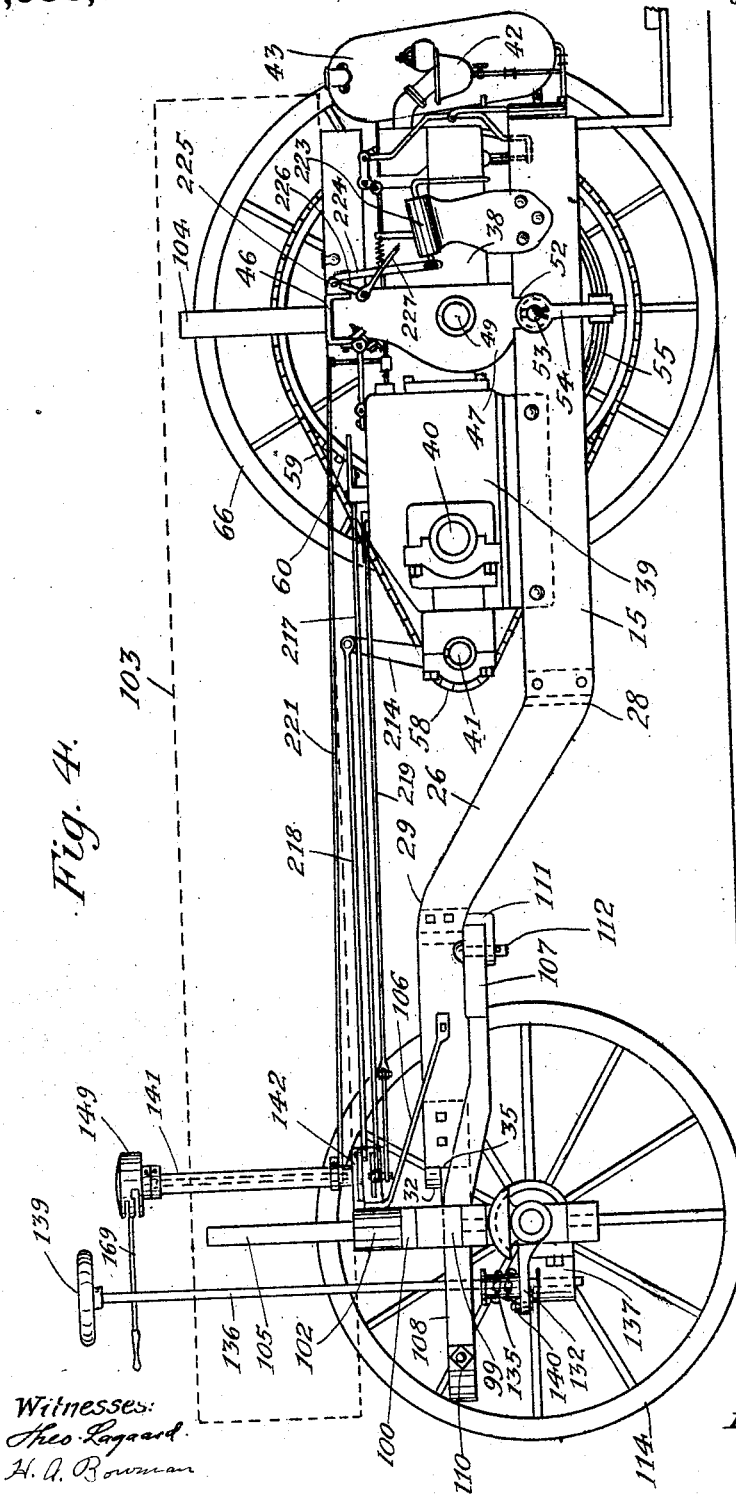

A. L. WYMAN.
COMBINED TRACTION ENGINE AND MOTOR WAGON.
APPLICATION FILED MAY 18, 1912.
1,083,044.
Patented Dec. 30, 1913.
8 SHEETS—SHEET 5.
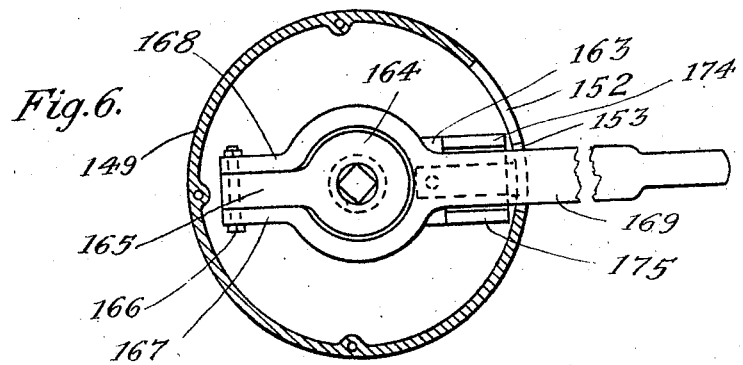
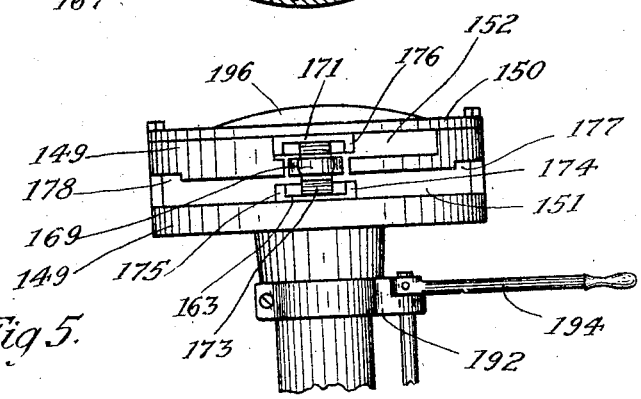
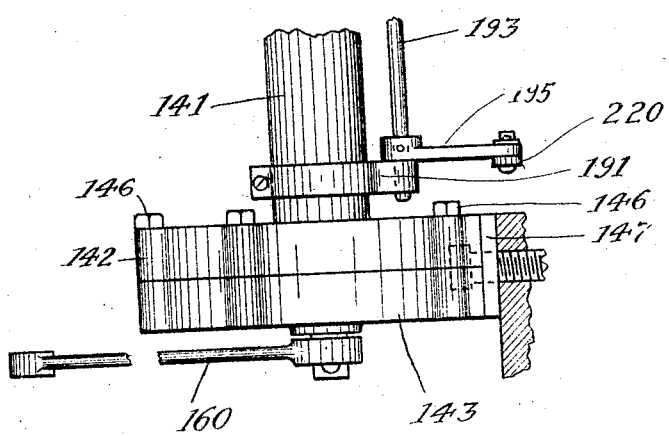
Witnesses:
Theo. Lagaard.
H. G. Bowman.
Inventor:
Alton L. Wyman
By F. A. Whiteley
his Attorney.

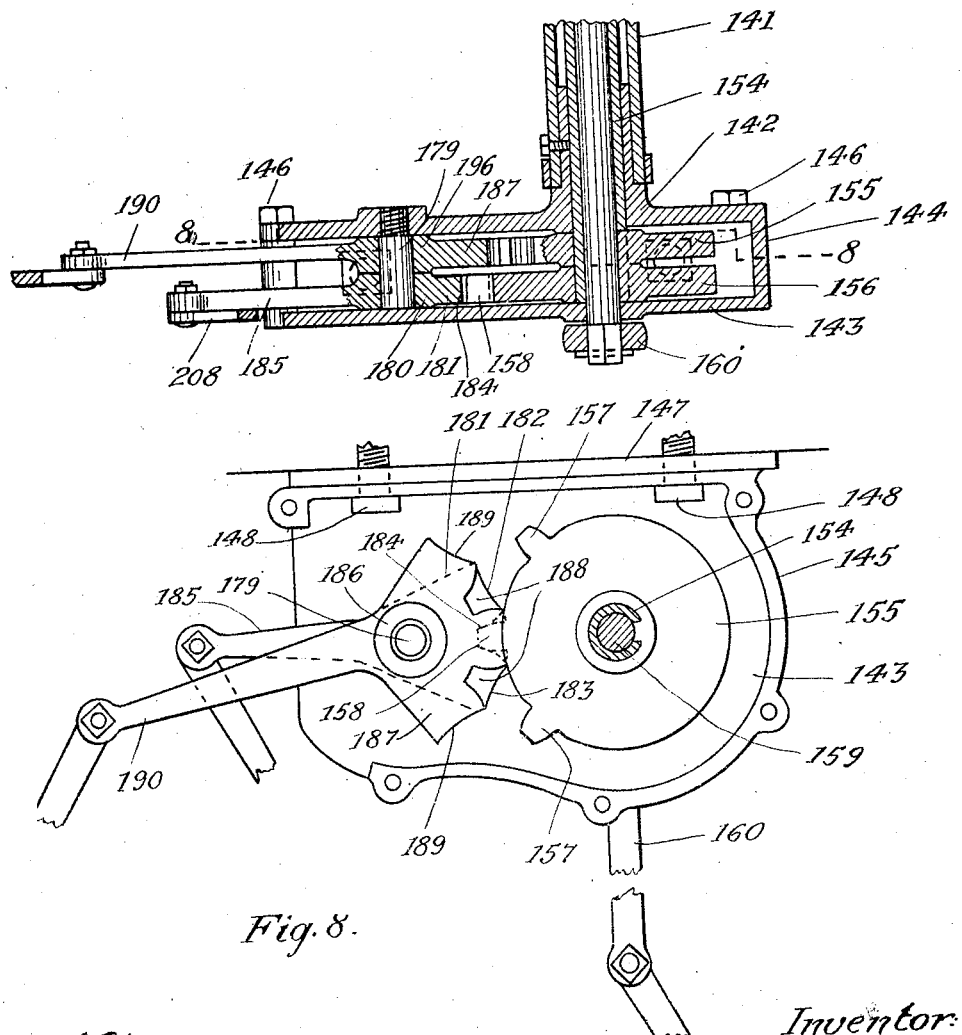

A. L. WYMAN.
COMBINED TRACTION ENGINE AND MOTOR WAGON.
APPLICATION FILED MAY 18, 1912.
1,083,044.
Patented Dec. 30, 1913.
9 SHEETS—SHEET 7.
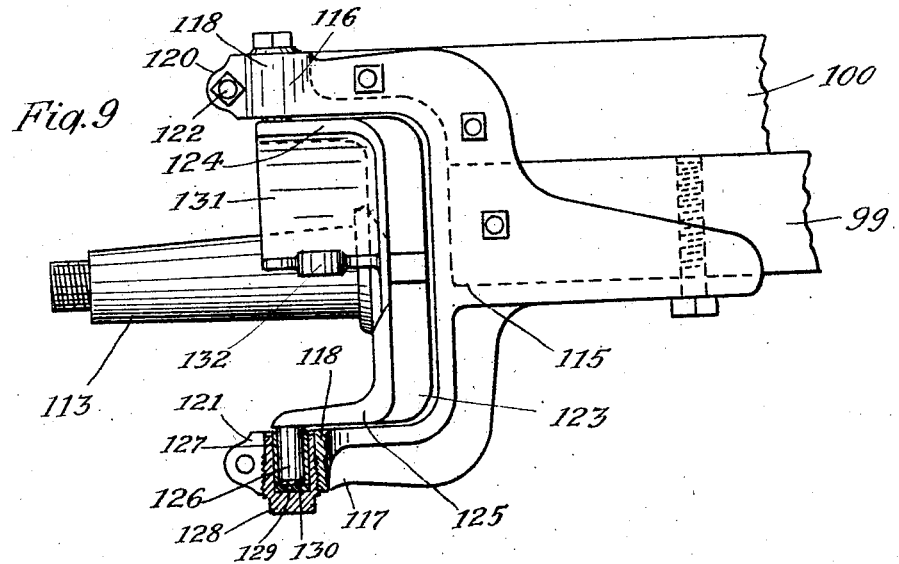
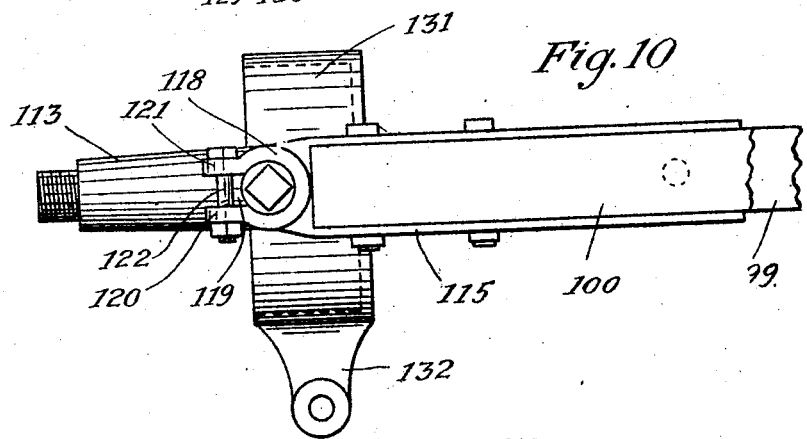
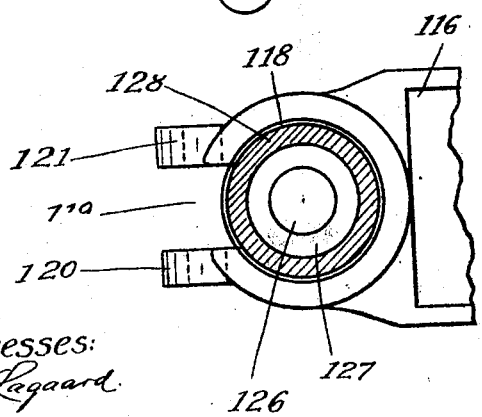
Witnesses:
Theo Lagaard
H. A. Bowman
Inventor:
Alton L. Wyman
By A. Whiteley
his Attorney.

A. L. WYMAN.
COMBINED TRACTION ENGINE AND MOTOR WAGON.
APPLICATION FILED MAY 18, 1912.

1,083,044.

Patented Dec. 30, 1913.
8 SHEETS—SHEET 8.

Witnesses:
Theo. Lageard
H. A. Bowman.

Inventor:
Alton L. Wyman.
By F. A. Whiteley
his Attorney.

UNITED STATES PATENT OFFICE.

ALTON L. WYMAN, OF MINNEAPOLIS, MINNESOTA, ASSIGNOR TO WINONA WAGON COMPANY, OF WINONA, MINNESOTA, A CORPORATION.

COMBINED TRACTION-ENGINE AND MOTOR-WAGON.

1,083,044.  Specification of Letters Patent.  Patented Dec. 30, 1913.

Application filed May 18, 1912.  Serial No. 698,260.

*To all whom it may concern:*

Be it known that I, ALTON L. WYMAN, a citizen of the United States, residing at Minneapolis, in the county of Hennepin and State of Minnesota, have invented certain new and useful Improvements in Combined Traction-Engines and Motor-Wagons, of which the following is a specification.

My invention relates to a combined traction engine and motor wagon, and has for its object to provide a power plant which is adapted to be interchangeably used either with the wheels and steering truck of a traction engine or with the wheels and front truck (also the steering truck) of a motor wagon, the power plant and means of supporting the same being such that when the same is used in connection with the motor wagon provision is made for supporting the wagon box directly upon the supporting means for the power plant.

In the modern system of farming by means of power, there are three fundamental forms of operation which a farmer may accomplish by means of a properly designed power plant. First, by means of a stationary power plant such operations as threshing, shredding, cutting silage, pumping water, etc., may be profitably effected. Second, by means of a traction engine having large and wide traction wheels of a well known type, operations of plowing, harrowing, seeding, and moving very heavy objects may be accomplished. And, third, for transporting produce and other materials considerable distances over farm roads, a power plant applied to a motor wagon is peculiarly desirable. But the average farmer cannot afford to own three separate power plants for performing the above sets of operations. It is, therefore, especially desirable to provide, if possible, and there is at the present time a great demand for, a power plant which may be interchangeably used to effect any or all of the above sets of operations as desired and as the exigencies of the cycle of farm operations may require.

It is the prime object of my invention to provide a power plant which may be used either as a stationary plant entirely dissociated with wheels of any sort, which may be associated with traction wheels and used as a traction engine and which may, associated with traction wheels and the front truck of a motor wagon, be applied to use as and for providing the power of a motor wagon.

In carrying out my invention, it is an especial object to provide means for mounting traction wheels in connection with the power plant which shall rotate in planes vertical to the axis of the main supporting axle of the power plant; and also to provide means for mounting on the same power plant ordinary wagon traction wheels adapted to run and track in the common wagon roads of a farming community and having the pitch and gather or inward slope usually employed in connection with the wheels of a wagon. To effect this, it is absolutely essential that the power plant itself shall be practically compact and shall be secured in a unitary frame structure, all parts of the power plant including an explosive engine, carbureter, muffler, radiator, fuel tank, and all other necessary parts being supported in this single frame structure, and it is an object of my invention to provide a power plant capable of use in producing such results.

It is a further object of my invention to provide a frame for the power plant which may readily be connected either with a special front steering truck when the device is used for a traction engine or with an ordinary two-wheeled truck such as is employed in a farm wagon when the machine is to be used as a motor wagon.

It is a further object of my invention to provide a control mechanism for the brakes, change speed and reverse of the transmission and a lever stand for operating said control mechanism which may be positioned upon the rear axle in connection with the power plant when the machine is used as a traction engine and which may readily be changed in position and be applied to the hound of a front wagon truck when the machine is used as a motor wagon, together with connections from said lever stand which may be selectively applied from the same when it is in either of its said positions.

It is a further object of my invention to provide a transmission and control system in combination with the interchangeable lever stand such as can be readily operated in conjunction therewith when the lever stand is in either of its said positions when the machine is used as a traction engine or as a motor wagon, respectively.

It is a further object of my invention to provide a front wagon truck in connection with the machine when used as a motor wagon in which the wheels are mounted on the stub shafts of a divided axle and the steering may be effected by oscillating said shafts as is usual in automobile structures and also in which the front axle itself may oscillate about a king-bolt in the manner common with farm wagons, means being provided for locking the axle when steering is effected through the short stubs and for locking the stub axles when steering is effected through the oscillation of the front axle bodily.

The full objects and advantages of my invention will appear in connection with the detailed description thereof and are particularly pointed out in the claims.

Figure 13:
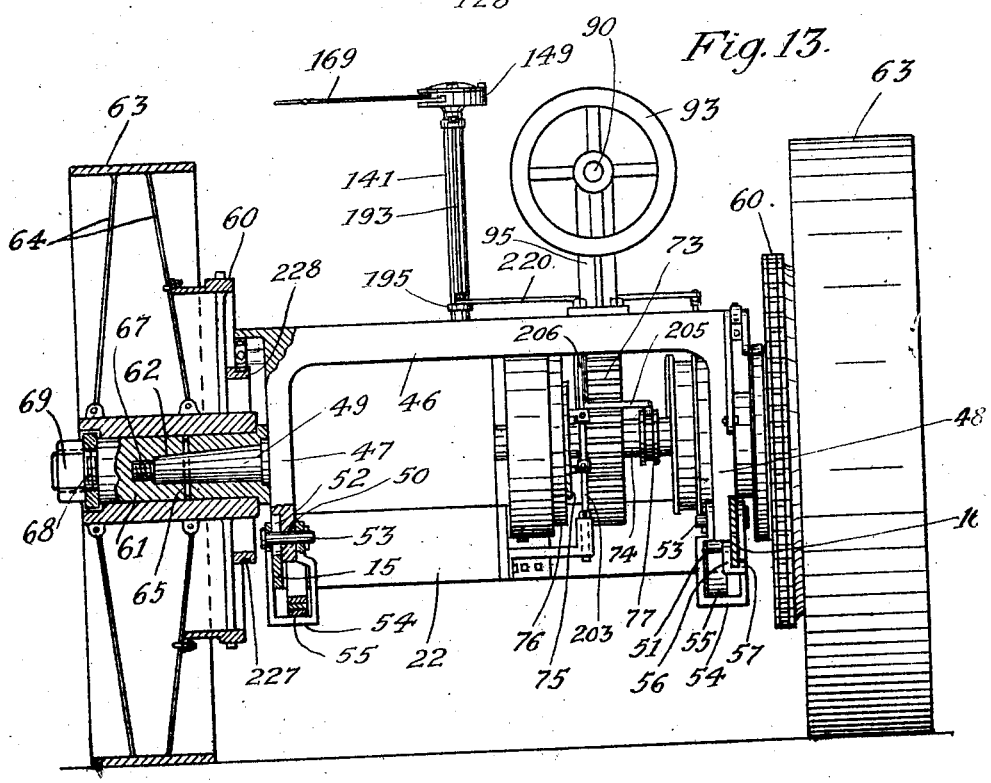

In the drawings illustrating a form of the application of my invention, Figure 1 is a plan view and Fig. 2 is a side elevation of my invention applied to traction wheels and traction steering truck to produce a traction engine. Fig. 3 is a plan view and Fig. 4 is a side elevation of the same parts applied to the wheels and front steering truck of a motor wagon. Fig. 5 is an elevation view of the interchangeable lever stand. Fig. 6 is a top plan view of the same with the lever case in section. Fig. 7 is a sectional elevation of the lever stand. Fig. 8 is a sectional plan taken on line 8—8 of Fig. 7, Figs 9 to 12, inclusive, are enlarged detail views of the stub axle mechanism of the front wagon truck. Fig. 13 is a rear end view partly in section of my invention when used as a traction engine, some parts being omitted.

The frame for supporting the power plant comprises a pair of unitary side members 15 and 16 of steel or other suitable material which are curved and extend at right angles at the rear forming cross members 17 and 18 meeting as indicated at 19 and there bolted to a right-angled foot 20 of a longitudinal frame member 21 extending centrally of the frame to a transverse member 22, to which the member 21 is bolted by means of a foot 23 similar to foot 20, the member 22 in turn having right-angled feet 24 and 25 by which the same is bolted to side frame members 15 and 16. The side frame members 15 and 16 extend forward from the point of attachment to cross member 22 in oblique portions 26 and 27, being also turned upwardly as indicated at 28 and turned horizontally in a forward direction as indicated at 29. Just beyond the turns 29 of portions 26 and 27, a cross-bar 30 is bolted to the said two portions and the ends of portions 26 and 27 of bars 15 and 16 are removably bolted to a casting 31 when a part of the steering truck when the power plant is to be applied to a traction engine and to a casting 32 pivotally connected with the king bolt of the front wagon truck when the power plant is to be used in connection with a motor wagon. Each of these castings 31 and 32 has identical angularly disposed wings 33 and 34 provided with shoulders 35 and 36 forming seats for the said ends of portions 26 and 27. To change from the traction engine steering truck to the motor wagon steering truck, therefore, would necessitate merely the removal of the bolts 37 by which the end portions 26 and 27 are secured to wings 33 and 34 of one machine and the securing of said bolts to wings 33 and 34 of the casting on the other machine.

The power plant comprising the motor 38, crank case 39, crank shaft 40, drive shaft 41, carbureter 42, fuel tank 43, muffler 44, differential 45, and transmission system later to be described, all of which are or may be of any well known construction, is rigidly supported wholly upon the frame formed by the bars 15, 16, 21 and 22. A rear axle member similar to that described and claimed in the co-pending application of Henry M. Kinney Serial Number 643,764 is employed which comprises a main transverse member 46 adapted to receive upon its upper surface a wagon box when the power plant is used in connection with a motor wagon, said transverse member having integrally secured thereto near the ends thereof depending members 47 and 48 upon each of which is also integrally secured at right angles to said depending members axle stubs 49 as most clearly shown in Figs. 4 and 13. These axle stubs are conical in shape and somewhat inclined downwardly, being in fact exactly the same as axle studs ordinarily employed for receiving the wheels of a common farm wagon, this inclination giving the pitch and gather which permits the spokes of the wheels of a farm wagon to be bulged inwardly and yet extend vertically when directly beneath the axle of the wagon. The power plant or rather the frame containing the same is suspended upon the aforesaid rear axle member, whether the same has applied thereto the wheels of a traction engine or traction wheels for a motor wagon, and this suspension is made through springs which absorb the shock and jar incident to use of the power plant for traction purposes in rough ground while nevertheless permitting the drive to be accurately transmitted from the power plant to the traction wheels.

As best shown in Fig. 13, when taken in connection with Figs. 2 and 4, the arms 47 and 48 have the lower portions 50 thereof partly cut away at 51 so as to overlie the bars 15 and 16, a portion of the arms 47 and 48 extending within slots 52 formed in bars 15 and 16. Through these end portions 50 extend bolts 53, said bolts also extending through the ends of strap yokes 54 of the form shown in Fig. 13 which yokes come below the central portion of heavy spring 55. The ends of the springs 55 are pivotally secured to links 56 having hooks 57 which come into and engage in notches in the lower edges of the bars 15 and 16 as best shown in Figs. 2 and 13. The frame members 15 and 16 and the power plant carried thereby are, therefore, suspended from the axle structure through the springs 55. The structure of the end members 50 engaging in slots 52 in the bars 15 and 16 is such that vertical relative movement of the axle structure and frame is possible, and only such vertical movement. The thrust of the wheels in driving the load is transmitted to the frame directly by the ends 50 in slots 52, while the power from the power plant is conveyed to the traction wheels from sprockets 58 on the drive shaft 41 through the sprocket chains 59 to the large sprocket wheels 60 on the traction wheels of the traction engine or of the motor wagon. While the relative vertical movement of the frame and power plant supported thereby with respect to the suspending axle structure will not be great, it will be sufficient to take up sudden and excessive shocks and will be permitted by means of the connection through the sprocket chain 59 between the power plant and the traction wheels. As the shock and strain to which a traction engine and more particularly a motor wagon is subjected, in neither of which is there any pneumatic tire or similar shock absorbing means, is necessarily quite severe and liable to cause considerable rack and ultimate injury to the mechanism of the power plant, it will readily be seen that the shock absorbing suspension herein provided is a matter of material advantage. Inasmuch as the power plant heretofore described is intended for use upon either a motor wagon or a traction engine, and since the wheels of a traction engine are materially different in character from the wheels of a motor wagon, means are provided for readily applying to the transverse axle structure traction wheels for the engine in place of the wheels for the motor wagon which are applied directly to the axle stubs 49. For this purpose, a sleeve 61 has formed therein a socket 62 adapted to receive the axle stubs 49, said socket being, as clearly shown in Figs. 2 and 13, eccentrically positioned so that when the sleeve 61 is positioned on the stub axle 49 the axis of said sleeve which is provided with a cylindrical outer surface, will fall in a line parallel to the top line of cross member 46, that is the elements of the outer bearing surface of the sleeves 61 are relatively horizontal with respect to the axis of the power plant. This is necessary because the traction wheels 63 have wide rims suspended by means of rods 64 in a well known manner, and the pitch and gather of wagon wheel construction cannot apply to a wheel of that type. The sleeves 61 are firmly secured to the stub axles 49 by means of pins 65 extending through said sleeves and stub axles as shown in Figs. 1 and 13.

The wheels 66 for the motor wagon are similar to wagon wheels in common use except that the tires may be specially constructed for traction purposes if desired. The hub and the spokes, however, are mounted in the usual way and the same are secured to the stub axles 49 by the usual nut screwed on to the threaded end 67 of said stub axle provided for that purpose. The sleeves 61 form the bearings for the traction wheels 63 and have a threaded end 68 similar to the threaded end 67 on the stub axles, the traction wheels being secured in position by means of a nut 69 screwed on said threaded end 68. To change from one set of wheels to the other, therefore, it is simply necessary to remove the wheels then in position and either take off or apply the sleeves 61 by punching out or driving in the pins 65 and then applying the other set of wheels to its proper bearing. Of course, the sprocket wheels 60 are secured to the respective sets of traction wheels, whether for the traction engine or the motor wagon, and the sprocket chains 59 will need to be disconnected and reapplied whenever the sets of wheels are changed. As it is common to use sprocket chains with interchangeable links, it is apparent that this part of the change can be effected with the utmost ease. If it is desired to use the power plant independently of any wheels, it is only necessary to drive the same above proper blocking, jack up the power plant so as to remove the wheels, and wedge the blocking into position, or bolt the frame to said blocking through flanges 70 on the frame members provided for that purpose. Upon the drive shaft 41 a pulley 71 is secured by means of which power from the engine, when used for stationary purposes, may be transmitted to any desired machine. This pulley is removably secured as indicated at 72 and may be taken off entirely when the machine is used as a traction engine and will usually be removed when the machine is used as a motor wagon, as indicated in Fig. 3.

The transmission system employed in my present invention is in all respects the same as that described and claimed in the co-pending application of Henry M. Kinney Serial Number 650,750, the lever system for controlling the same, however, is specifically different from that shown in the aforesaid application, and is particularly devised for application either to the rear axle member 46 when the machine is fitted out as a traction engine or to the hound of a front wagon truck when the machine is used for a motor wagon. It will not be necessary, therefore, to more specifically describe the spur gear transmission than to state that the spur gear 73 is fast on a sleeve 74 loose on the crank shaft 40, and that the clutch 75 splined on said sleeve is adapted to engage the clutch member 76 fast on the shaft for driving the engine ahead at high speed, while the clutch 77 splined to sleeve 74 is adapted to be moved to one or the other of two active positions as described in the aforesaid application, one of said active positions connecting gear 73 to drive the engine at slow speed ahead while the other active position connects the engine to drive in reverse direction at slow speed. This connection being made possible by braking one or the other of drums 78 and 79 at the time of shifting the clutch member 77 to corresponding active position, as fully described in the aforesaid application Serial Number 650,750.

As already described the portions of frame members 15 and 16 extending forwardly are brought together and removably bolted to a casting 31 when it is desired to use the machine as a traction engine. This casting is provided with a vertical bearing 80 in which is mounted the spindle 81 of a fork 82 having journaled therein at 83 a steering wheel 84 provided with a peripheral steering flange 85. Upon the end of the spindle 81 is keyed a collar 86 carrying an off-set horizontal segment gear 87. A stand 88 extends upwardly from the casting and is provided with a bearing 89 in which is journaled a rod 90. The rod 90 has on the forward end thereof a worm 91 engaging in the segment worm gear 87, said worm being held to proper position by a collar 92 on rod 90 outside of bearing 89. The rod 90 has on the rear end thereof a steering wheel 93 and is journaled adjacent said steering wheel in a bearing 94 on a stand 95 removably secured by bolts 96 upon the top of the transverse axle member 46. The rod 90 may, if desired, be made sectional and united by means of bolt or universal joint, as indicated at 97, for convenience in removing from the power plant when changing the same to the motor wagon.

When the power plant has the wheels 66 applied thereto for use as a motor wagon, extensions 26 and 27 of side frame members 16 and 17 will be bolted to the wings 33 and 34 of casting 32. This casting comprises an eye piece 98 as indicated in dotted lines in Fig. 3 which is positioned between the axle 99 and sand-board 100 being pivotally connected thereto in the usual way by a king bolt 101, which king bolt extends through the usual front hound 102 for receiving the wagon box 103 indicated in dotted lines in Fig. 4. The hound 102, therefore, is pivotally movable relative to the front axle structure and, of course, will be held in alinement with the frame members 15 and 16 by means of the box between the stakes 104 on the rear axle 46, and the stakes 105 on the hound 102, being additionally held rigid with said frame if desired by means of a brace 106 removably bolted between the hound 102 and the frame extension 26.

The usual half circle 107 is provided with arms 108, 109, angularly disposed for receiving a tongue upon a bolt 110 in a well known manner, the half circle 107 extending beneath the frame extensions 26 and 27 just forward of the curve 29 and being held by a clip 111 secured to cross bar 30 and extending beneath the half circle 107. Ordinarily a tongue will not be used, in which case the half circle 107 is secured in fixed relation to the power frame by means of a bolt 112 passing through the half circle and the clip 111. The axle 99 is thus also held fixed relative to the frame and the steering of the motor wagon will be effected by means of stub axles 113 upon which the front wheels 114 are mounted, these stub axles being pivotally secured to the axle 99, as best shown in Figs. 9 and 12. A casting 115 is bolted to the axle 99 and may also be bolted to the sand board 100. This casting is provided with two horizontal arms 116, 117, respectively, extending parallel to and in the plane of the axle 99. At the end of each of these arms is a bearing 118 which opens outwardly through a cleft 119, there being lugs 120, 121, on either side of said cleft through which a bolt 122 may be extended. The stub axle 113 is integrally secured at the center of a casting 123 having arms 124—125 similar to but of less extent than arms 116, 117, the casting being of a size such as may swing freely between the said arms 116, 117. Upon the ends of the arms 124, 125, are outwardly extending trunnions 126. The trunnions 126 are assembled in the bearings 118 by passing the same through the clefts 119. Bushings 127 are then pushed over the trunnions within the bearing and a sleeve nut 128 screwed into the bearing in surrounding relation to the bushing 127, the bottom of the cavity within said sleeve nut being provided with a filler 129 and ball bearings 130, as clearly shown in Fig. 9. Bolts 122 may then be secured through lugs 120, 121, to complete final assembling of the parts. The casting 123 is formed with a semi-circular cap 131 which extends above the inner end of the stub axle 113 and overlies the inner edge of the bearing which the hubs of the wheels 114 have on stub axles 113, thus operating to keep out dust and dirt. One edge of the cap 131 has formed thereon an arm 132, the arms 132 on the two wheel castings being connected by chains 133 and 134, respectively, with a drum 135 on the end of a shaft 136 which is journaled vertically in brackets 137 and 138 extending forwardly from the axle 99. The vertical shaft 136 has on the upper end a hand wheel 119 and as the chains 133 and 134 both extend tangentially from the same peripheral portion of drum 135, when the shaft 136 and drum 135 are turned by wheel 139, one of said chains will be wound up and the other correspondingly unwound, thus operating to oscillate the wheels 114 in unison on their stub axles, the arms 132 each being pivotally connected with a link 140 extending between the same. By means of a bolt dropped through this link and a flange on bracket 137 underlying the same, the stub axles may be locked in the axis of the axle 99 when by removing the bolt 112 and attaching an ordinary tongue to the bolt 110 horses may be hitched to the wagon and the same pulled and guided thereby in the usual way.

The control system employed comprises a single lever having three possible movements, any one of which connects with mechanism for operating the transmission differentially. This lever mechanism comprises primarily a tubular stand 141 which is secured to a base plate 142, said base plate having bolted in parallel spaced relation therewith a similar plate 143 as indicated most clearly in Figs. 5 and 7, plate 142 being provided with a marginal flange 144 and plate 143 with a similar marginal flange 145 so that when said plates are secured together by means of bolts 146 a housing is formed between the plates. The flanges 144 and 145 extend around three sides of the plates but are omitted on the fourth side so that the chamber formed in the said housing is open at one side. The flange 145 is integrally extended at one side in a lip 147 and by means of bolts 148 extending through such lip and half openings in the flanges 144 and 145, the entire lever stand is removably secured either to the cross axle 46 as shown in Figs. 1 and 2 or the hound of the wagon truck as shown in Figs. 3 and 4. To the top of tubular stand 141 is secured a cup-like cylindrical head 149 to the top of which is bolted a cap 150. The cylindrical head has formed at one side thereof two peripheral grooves 151 and 152 connected by a passage 153 extending from the center of groove 151 to one end of the groove 152.

Within the tubular member 141 is a tubular sleeve 154 which has secured thereto in the housing formed by the plates 143, 144, a pair of disks 155, 156, disk 155 having a pair of teeth 157 positioned on said disk at separated points thereof, while disk 156 is provided with a single tooth 158 relatively positioned midway between teeth 157 on disk 155. Obviously, the two disks 155 and 156 with the teeth thereon may be cast in a single piece if desired. Through the center of sleeve 154 extends a shaft 159, the same being freely rotatable in sleeve 154 and having secured to the lower end thereof an arm 160. As shown, the arm 160 is without the housing formed by plates 142, 143, but it is practicable to widen said housing and mount the arm 160 within the same beneath the disk 156 in which case said arm would extend out through the open end of the housing before mentioned. Secured to the upper end of sleeve 154 and within the cavity of the cup member 149 is a hub 161 which has a shoulder 162 forming a bearing in the bottom plate of member 149, the hub 161 being provided with an arm 163 extending to a point adjacent the slot 151 in the wall of member 149. Loosely mounted on shaft 159 and resting upon hub 161 is a collar 154 provided with an arm 165. Pivotally secured to the end of arm 165 by means of a bolt 166 extending through arms 167 and 168 straddling the arm 165 is a lever 169, arms 168 and 167 being integral extensions of said lever and being expanded so as to embrace or extend about the collar 164, and the exposed part of the hub 161. Above the collar 164 and secured to shaft 159 is a hub 170 extending from which is an arm 171, the arm 171 being parallel with the arm 163 on hub 161. The lever 169 is held normally in balanced position between arms 171 and 163 by means of a leaf spring 172 secured to arm 171 and a similar spring 173 is secured to arm 163. The lever 169 is thus held not only in balanced position between the arms 163 and 171 but within the passage 153 between slots 151 and 152, which passage is of approximately the width of the lever so that the margins of the wall of member 149 at such passage will normally hold the lever 169 from movement in either direction. The arm 163 is broad and provided with a pair of wings 174, 175 forming a space between the same adapted to receive the shank of lever 169 when the same is pressed downwardly against the force of spring 173. The lever 171 is provided with corresponding wings 176 adapted to receive between them the shank of lever 169 when the same is pressed upwardly against the force of spring 172. It will thus be seen that when lever 169 is pressed down between wings 174 and 175, it may be moved in either direction in the slot 151, and when so moved will carry with it arm 163 which will oscillate the sleeve 154 in either of said directions. Notches 177 and 178 are formed above at the ends of the slot 151 for receiving and holding the lever 169 in either of its extreme positions. When the lever 169 is pressed upwardly between wings 176 on arm 171, it may be moved in one direction only in slot 152, carrying with it the arm 171 which will thereby rock shaft 159 and arm 160 thereon. Upon a post 179 secured between plates 143 and 142 is pivoted a hub 180 having on one side thereof a segment 181 formed with two circular engaging portions 182, 183 and an intermediate notch 184 for receiving the tooth 158 on disk 156. Secured to hub 180 and extending away from segment 181 is an arm 185. Pivotally mounted upon post 179 above hub 180 is a hub 186 having thereon a segment 187 formed with two notches 188 and also formed with circular engaging portions 189 similar to engaging portions 182 183; and fast on hub 186 and extending outwardly from segment 181 is an arm 190. Journaled in brackets 191, 192, secured to the tubular stand 141 is a rock shaft 193 having thereon a hand lever 194 and an arm 195. The member 49 is closed by a cap 196. All of the above parts are comprised in the single removable lever stand secured by means of bolts 148 to the rear axle 46 or the front hound 102, according to whether the machine is to be used as a traction engine or a motor wagon.

The arms 160, 185, 190, and 195 are connected with the means for operating the transmission and brake, as shown in Figs. 1 and 3. When the machine is used as a traction engine and the lever stand is secured to rear axle 46 as shown in Fig. 1, the arm 160 is pivotally connected by a link 197 with an arm 198 pivoted at 199, and having an angularly extended foot 200 engaging in a notch 201 in a clutch lever 202. This lever is fast on a rock shaft 203 on which is an arm 204 for operating the clutch 75 for connecting the machine for fast speed ahead. This clutch 75 is a cone clutch and requires a very small movement to effect clutching or unclutching action. The lever 202, therefore, requires a very small movement to bring about through arm 204 the required movement and hence the notch or cam surface 201 on said lever will not need to be deep in order that the rocking of the foot 200 shall effect the necessary clutching and unclutching action. The clutch 77 is operated by means of an arm 205 on a rock shaft 206 journaled vertically above rock shaft 203, as most clearly shown in Fig. 13, said rock shaft having thereon an arm 207 pivotally connected by link 208 with the arm 185, movement of arm 185 as shown in Fig. 1 where connections are made for the traction engine in one direction placing clutch 77 in one of its active positions while movement of said arm in the other direction puts clutch 77 in its other active position. The drums 78 and 79 are each provided with brake bands. The free end of brake band on drum 79 is connected by link 209 with an arm 210 on a rock shaft 211 journaled adjacent and parallel with drive shaft 41, the free end of the brake band on drum 78 being connected by link 212 with another arm 213 on said rock shaft 211, the brake bands extending in opposite directions from the fixed point thereof about the drums so that movement of rock shaft 211 in either direction would operate to tighten one brake band and loosen the other.

The rock shaft 211 has fast thereon an arm 214 which is connected by link 215 with the arm 190. In addition to the arm 207 the vertical rock shaft 206 is provided with a second arm 216 extending at a different angle so that when the lever stand is secured to the hound of the front wagon truck when the machine is employed as a motor wagon, the arm 185 may be connected to said arm 216 by a link 217, in all respects similar in construction and function to link 207 except that the same is longer to the required degree. When arm 207 is employed for making the connection, therefore, the arm 216 is idle and when arm 216 is employed arm 207 is idle. In other respects the transmission and control system is the same when the plant is employed as a motor wagon as when it is employed as a traction engine, a longitudinally extended link 218 replacing the link 215 for connecting shafts 211 and 190. Also the connection with arm 198 is made when the stand is on the hound of the front motor wagon truck by means of a link 219 similar excepting longer than link 197. The arm 195 is connected by means of a link 220 when the plant is used for a traction engine or a similar link 221 when the machine is used as a motor wagon with valve mechanism for operating an air brake piston in a cylinder 223 which engages an arm 224 on a rock shaft 225, having thereon an arm 226 connected with an end of brake bands 227 extending about brake drums 228, as indicated in Figs. 3 and 13.

The operation of the machine whether used as a traction engine or as a motor wagon will be substantially the same except that when used as a motor wagon the high speed will be the one principally employed, while when used as a traction engine the slow speed will be more generally used. The power plant, it will be observed, is identical in each case, as is also the transmission and control system. The power plant is, therefore, strictly interchangeable. This is by far the most expensive feature of either a traction engine or a motor wagon so that having this power plant fitted up either for a traction engine or a motor wagon, there will be comparatively little expense to the farmer to obtain the alternative parts required to fit the power plant for use in connection with the other machine, and the change may be made with considerable ease and dispatch. For example, if a farmer buys a traction engine, as herein illustrated, he will need additionally to be able to change the same into a motor wagon only the wagon traction wheels 66, the front wagon truck, and the extra connecting links 217, 218, 219 and 221 for the control device. To effect the transformation from a traction engine to a motor wagon, he will first remove from the traction engine the lever stand 141 and connected parts, and the steering truck together with the stand 95 and steering rod 90, replacing the steering truck of the traction engine with the front truck of the motor wagon, which is accomplished merely by bolting the members 27 and 26 to the wing members 33 and 34 on motor wagon truck casting 32. The traction engine wheels and the extension members 61 will then be removed from the stub axles 49 and the motor wagon truck wheels 66 placed on said stub axles and geared to the power plant by means of the sprocket chains 59. The lever stand may then be bolted to the hound 102 of the wagon truck by means of the bolts 148, and the proper connections made to the transmission and brake levers by means of links 217, 218, 219, and 221. A wagon box of any usual construction may then be placed upon the transverse member 46 and the front hound 102 between the stakes 104, 105, respectively, the brace 106 between the hound 102 and member 26 having first been bolted into position, if such brace is employed. The transformation will then be complete and the traction engine will have become a motor wagon. It is to be noted that for convenience of assembling the box 103 on the hound 102 and transverse member 46, the steering shaft 136 may be socketed in the steering drum 135 and inserted through a hole in the bottom of the box and into said socket after the box has been placed in position.

I claim.

1. A motor vehicle comprising a framework, a power plant mounted on said framework, a plurality of sets of traction wheels have different characteristics of shape and mounting, each set being adapted to cooperate with said power plant and be driven thereby, and means for mounting any one of said sets on said framework.

2. A motor vehicle comprising a framework, a power plant mounted on said framework, a set of traction engine wheels having two rows of spokes and hubs formed with cylindrical bearings, a set of wagon traction wheels having a single row of spokes extending outwardly obliquely to the hub, means on each set of wheels for connecting the same to the power plant to be driven thereby and means for mounting either set on said framework.

3. A motor vehicle comprising a framework, a power plant mounted on said framework, running gear including traction wheels and steering wheels of a traction engine, running gear including traction wheels and steering wheels of a motor wagon, and means for mounting said framework and power plant upon either of said sets of running gear so that the power plant will actuate the traction wheels thereof.

4. A motor vehicle comprising a framework, a power plant rigidly secured in said framework, a transverse member bridging said power plant provided with stub axles, means for suspending the framework from said member, said stub axles being adapted to receive motor wagon traction wheels directly thereon, and removable members for application to said stub axles to form the bearings of traction engine wheels.

5. A motor vehicle comprising a framework, a power plant rigidly secured in said framework, a transverse member bridging said power plant provided with stub axles, means for suspending the framework from said member, said stub axles being adapted to receive motor wagon traction wheels directly thereon, and a cylindrical member having a socket corresponding in form to the outline of said stub axle and so positioned in the cylindrical member that when assembled said cylindrical member will provide a bearing for wide rimmed traction engine wheels.

6. A motor vehicle comprising a framework, a power plant mounted in said framework, running gear including traction wheels and steering wheels of a traction engine, running gear including traction wheels and steering wheels of a motor wagon, means for mounting said framework and power plant upon either of said sets of running gear so that the power plant will actuate the traction wheels thereof, a control system including a lever stand and series of levers, and means for mounting said lever stand upon the rear axle of the traction engine or the front steering truck of the motor wagon and for operatively connecting the levers thereof in either of said positions.

7. A motor vehicle comprising a framework having side frame pieces, a power plant rigidly secured in said framework, a transverse member bridging said power plant provided with stub axles, traction wheels on said stub axles, depending yokes secured to the transverse member and embracing the side frame members, springs centrally secured in said yoke members and hooks attached to the ends of said springs and engaging beneath the side frame members by means of which said framework is suspended from the transverse member.

8. A motor vehicle comprising a framework having side frame members, a power plant rigidly secured in said framework, a transverse member bridging said power plant, traction wheels mounted on said transverse member, depending portions at the ends of said transverse member extended so as to enter slots formed in the side members and movable vertically therein relative to said members, and spring means for suspending said framework from the said depending portions.

9. A motor vehicle comprising a framework, a power plant rigidly secured on said framework, stub axles for receiving motor wagon traction wheels, and cylindrical bearing members adapted to be removably applied to said stub axles to extend and enlarge the same for receiving traction engine wheels.

10. A motor vehicle comprising a framework, a power plant rigidly secured on said framework, a transmission and control system on said power plant including means to operate the change-speed, reversing, and braking elements thereof, running gear including traction wheels and steering wheels of a traction engine, running gear including traction wheels and steering wheels of a motor wagon, means for mounting said framework and power plant upon either of said sets of running gear so that the power plant will actuate the traction wheels thereof, a lever stand and series of levers, and means for mounting said lever stand upon the rear axle of the traction engine or the front truck of the motor wagon and for operatively connecting the levers thereof in either of said positions with said change-speed, reversing, and braking elements.

11. In a motor wagon, a front truck comprising a centrally pivoted axle, stub axles on the end thereof capable of independent oscillation thereon, means for securing said axle from oscillation about its central pivot, and means for securing the stub axles from oscillation on their pivots.

12. In a motor wagon, a front truck comprising a centrally pivoted axle and means for securing an ordinary wagon tongue thereon, stub axles mounted on vertical axes on the ends of said axle, means to secure said stub axles from oscillation on the axle, and means for securing said first named axle from oscillation about its central pivot.

13. In a motor wagon, a front truck comprising a centrally pivoted axle and means for securing an ordinary wagon tongue thereon, stub axles mounted on vertical axes on the ends of said axle, means to secure said stub axles from oscillation on the axle, means for securing said first named axle from oscillation about its central pivot, means under the control of the operator for oscillating said stub axles to steer the motor wagon when the axles are not so held.

In testimony whereof I affix my signature in presence of two witnesses.

ALTON L. WYMAN.

Witnesses:
F. A. WHITELEY,
H. A. BOWMAN.